United States Patent [19]

Caulfield

[11] Patent Number: 4,544,230
[45] Date of Patent: Oct. 1, 1985

[54] METHOD OF EVALUATING A POLYNOMIAL FUNCTION USING AN ARRAY OF OPTICAL MODULES

[75] Inventor: Henry J. Caulfield, Nagog Woods, Mass.

[73] Assignee: Battelle Development Corporation, Columbus, Ohio

[21] Appl. No.: 459,168

[22] Filed: Jan. 19, 1983

[51] Int. Cl.$^4$ .................. G02B 5/14; G02B 5/172
[52] U.S. Cl. ................. 350/96.14; 350/96.10; 350/96.13; 350/96.18; 350/353; 350/355; 350/356; 350/358; 364/130; 364/194; 364/800; 364/807; 364/808; 364/819; 364/821; 364/822; 364/841; 364/861; 364/862
[58] Field of Search ............... 350/96.10, 96.14, 96.13, 350/96.18, 356, 353, 355, 358, 162.12, 162.13, 162.14; 455/608, 600, 609, 610, 611, 612; 364/167, 194, 459, 713, 735, 807, 808, 813, 819, 821, 822, 861, 862, 900, 801, 802, 841, 130

[56] References Cited

U.S. PATENT DOCUMENTS

| | | | |
|---|---|---|---|
| 2,921,738 | 1/1960 | Greening | 364/819 |
| 4,124,280 | 11/1978 | Berg et al. | 364/822 |
| 4,156,923 | 5/1979 | Lampe et al. | 364/819 |
| 4,187,000 | 2/1980 | Constant | 350/96.12 |
| 4,389,093 | 6/1983 | Jackson | 364/822 |
| 4,403,833 | 9/1983 | Kenan et al. | 350/96.14 |

FOREIGN PATENT DOCUMENTS 754351 8/1980 U.S.S.R. ............... 350/96.14

OTHER PUBLICATIONS

Mead et al., "Introduction to VLSI Systems" Carnegie-Mellon Univ. Pub., 9/80, pp. 271-292.
Casasent et al., "Iterative Optical Vector-Matrix Processors" NASA Conf. Pub. No. 2207, 12/81, pp. 105-118.
Caulfield et al., "Optical Implementation of Systolic Array Processing" NASA Conf. Pub. No. 2207, 12/81, pp. 53-60.
Tarasevich et al., "Matrix Vector Multiplier . . . Modulators" NASA Conf. Pub. No. 2207, 12/81, pp. 61-70.
Tsai et al., "Acousto-Optic . . . Technology" S.P.I.E. Conf. Pub., vol. 180, 1979, pp. 160-164.

*Primary Examiner*—William L. Sikes
*Assistant Examiner*—Brian M. Healy
*Attorney, Agent, or Firm*—Philip M. Dunson

[57] ABSTRACT

Methods and apparatus for providing an optical analog quantity proportional to $$p(x) = a_n x^n + a_{n-1} x^{n-1} + \cdots + a_2 x^2 + a_1 x + a_0$$
$$= ((((a_n x + a_{n-1})x + a_{n-2})x + \cdots + a_2)x + a_1)x + a_0.$$

Input light ($a_4$) of intensity proportional to $a_n$ is directed (21,31) to the input end of an nth optical module comprising a modulator (22) whose output light intensity is responsive to an electrical potential difference across it and a beam combiner (23). While the light is passing through the modulator (22), a potential difference (24) is applied across it such that the intensity of the output light from the modulator (22) is proportional to $a_n x$, and this light ($a_4 x$) is directed, through the beam combiner (23), to the output end of the optical module. Input light ($a_3$) of intensity proportional to $a_{n-1}$ is directed (25), via the beam combiner (23), to the output end of the optical module, to combine with the light from the modulator (22) so that the intensity of the output light (32) from the nth optical module is proportional to $a_n x + a_{n-1}$; this light is directed to the input end of an (n−1)th optical module essentially similar to the nth; and so on in the same manner; and finally to the first module, so that its output light has an intensity proportional to $p(x)$.

13 Claims, 14 Drawing Figures

Velocity Matched Input

FIG. 10

METHOD OF EVALUATING A POLYNOMIAL FUNCTION USING AN ARRAY OF OPTICAL MODULES

The present invention is related to the subject matter of the copending U.S. patent applications Ser. No. 450,153, filed Dec. 15, 1982, of Henry John Caulfield, for Systolic Array Processing, which discloses subject matter generic to some of the matter in the present application; and Ser. No. 459,167, filed Jan. 19, 1983, (the same date on which the present application was filed) of Carl M. Verber, for Optical Computation, which discloses most of the subject matter in the present application. Said applications are assigned to the assignee of the present invention. To the extent that subject matter disclosed or claimed in the present application is disclosed in, or obvious from, the copending earlier application cited above, benefit of the filing date of the earlier application is hereby claimed for such subject matter under 35 USC 120. Also said earlier application is hereby incorporated hereinto by reference and made a part hereof the same as is fully set forth herein, for purposes of indicating the background of the present invention and illustating the state of the art.

FIELD

This invention relates to systolic pipeline processing for evaluation of polynomial functions with optical methods and apparatus. It is especially useful for analog computation at very high speeds, and has a wide variety of applications.

BACKGROUND

Except where otherwise indicated herein, the electrooptic components employed in typical embodiments of the present invention are now well known. Convenient ways of making them are described in the above mentioned patent applications and in the references cited therein and herein.

The disclosure in the earlier copending application includes the paper by H. J. Caulfield, et al[2] wherein it is shown how certain algorithms for matrix-vector multiplication can be implemented using acoustooptic cells for multiplication and input data transfer and using CCD detector arrays for accumulation and output of the results. No 2-D matrix mask is required; matrix changes are implemented electronically. A system for multiplying a 50-component nonnegative-real matrix is described. Modifications for bipolar-real and complex-valued processing are possible, as are extensions to matrix-matrix multiplication and multiplication of a vector by multiple matrices.

During the last several years, Kung and Leierson at Carnegie-Mellon University[1,5] have developed a new type of computational architecture which they call "systolic array processing". Although there are numerous architectures for systolic array processing, a general feature is a flow of data through similar or identical arithmetic or logic units where fixed operations, such as multiplications and additions, are performed. The data tend to flow in a pulsating manner, hence the name "systolic". Systolic array processors appear to offer certain design and speed advantages for VLSI implementation over previous calculational algorithms for such operations as matrix-vector multiplication, matrix-matrix multiplication, pattern recognition in context, and digital filtering. The earlier copending application deals with improving systolic array processors by using optical input and output as well as new architectures for optical signal processing, particularly for multiplications involving at least one matrix; and it points out that many other operations can be performed in an analogous manner.

DISCLOSURE

The present invention comprises methods and apparatus for providing optical analog quantities for evaluating polynominal functions.

A typical method according the present invention for providing an optical analog quantity that is approximately proportional to the value of a polynomial function expressible in the form $$p(x) = a_n x^n + a_{n-1} x^{n-1} + \cdots + a_2 x^2 + a_1 x + a_0$$
$$= ((((a_n x + a_{n-1})x + a_{n-2})x + \cdots + a_2)x + a_1)x + a_0$$

comprises directing input light of intensity approximately proportional to the coefficient $a_n$ to the input end of an nth optical module comprising at the input end a modulator whose output light intensity is approximately proportional to a known function of an electrical potential difference across it and at the output end a beam combiner, applying across the modulator, while the light is passing through it, a potential difference approximately proportional to a function of x such that the intensity of the output light from the modulator is approximately proportional to $a_n x$, directing the output light from the modulator, through the beam combiner, to the output end of the optical module, directing input light of intensity approximately proportional to the coefficient $a_{n-1}$, via the beam combiner, to the output end of the optical module, to combine with the output light from the modulator so that the intensity of the output light from the nth optical module is approximately proportional to $a_n x + a_{n-1}$; directing the output light from the nth optical module to the input end of an $(n-1)$th optical module essentially similar to the nth; and so on in the same manner; and finally to the first module, so that its output light has an intensity approximately proportional to $p(x)$.

Typical apparatus according to the present invention for performing the method comprises an electrooptic planar waveguide; a plurality, n, of integrated optical modules in the waveguide, each module comprising at its input end a modulator for receiving light travelling in a predetermined input direction and transmitting a controlled proportion thereof further in a predetermined output direction to the output end, and a beam combiner for receiving the light from the modulator and transmitting a predetermined proportion thereof further in the predetermined output direction and on through the output end of the module;

the modulator comprising electrooptic diffractive means comprising a pair of electrodes for forming a Bragg grating therebetween, positioned with a direction of Bragg incidence approximately in the predetermined input direction, the first electrode comprising a first set of substantially straight and parallel, thin, elongate, electrically conductive members connected together at one end, and the second electrode comprising a second set of substantially straight and parallel, thin, elongate, electrically conductive members, interleaved with the first set, insulated therefrom, and connected together at the opposite end, so that when a first electrical potential is applied to the first electrode and a second electrical potential is applied to the second electrode the controlled portion of input light transmitted through the modulator is provided by a Bragg diffraction thereof in the predetermined output direction and has an intensity approximately proportional to a known function of the difference between the first and second electrical potentials; and the beam combiner comprising a fixed surface grating;

diode laser means and collimating means for directing input light of intensity approximately proportional to the coefficient $a_n$ to the input end of the nth optical module;

means for applying across the electrodes of the modulator, while the light is passing through the modulator, a potential difference approximately proportional to a function of x such that the intensity of the output light from the modulator is approximately proportional to $a_n x$;

diode laser means and collimating means for directing input light of intensity approximately proportional to the coefficient $a_{n-1}$, via the beam combiner, to the output end of the optical module, to combine with the output light from the modulator so that the intensity of the output light from the nth optical module is approximately proportional to $a_n x + a_{n-1}$;

the (n−1)th optical module being positioned to receive the output light from the nth optical module in the predetermined input direction of the (n−1)th module;

and so on, in the same manner, and finally to the first optical module, so that the intensity of the polynomial function output light from the first optical module is approximately proportional to $$((((a_n x + a_{n-1})x + a_{n-2})x + \cdots + a_2)x + a_1)x + a_0.$$

DRAWINGS

All of the drawings are schematic views.

FIGS. 7a and 7b show a typical combination of pipeline processors as in FIGS. 4 and 6. FIG. 7a illustrates the use of the problem-division technique to accommodate complex, positive $a_k$ and complex x of either sign. FIG. 7b illustrates a further division to accommodate either sign for $a_k$.

CARRYING OUT THE INVENTION

The following disclosure includes a slight revision of the paper by C. M. Verber, R. P. Kenan, H. J. Caulfield, Jacques E. Ludman, and P. Denzil Stilwell, Jr., "Suggested Integrated Optical Implementation of Pipelined Polynomial Processors"; in Advances in Optical Information Processing, Proc. SPIE, vol. 388, 1983, pp. 221-227 (Paper Number 388-30 of the SPIE (Society of Photo-Optical Instrumentation Engineers) Los Angeles Technical Symposium, held Jan. 17–21, 1983; presented there orally on Jan. 21, 1983.). In the paper, it is shown that optical systolic pipeline processors for polynomial evaluation can be built using Horner's rule; and that, with integrated optics techniques, it is possible to fabricate large-order pipelines operating at very high speeds.

POLYNOMIAL EVALUATION OPTICAL PIPELINES

The use of optics to evaluate numerical quantities is of great interest because the evaluations can often be carried out at high speed with little electrical power consumption. Because no general purpose optical computers are available, we must design new algorithms and architectures for each new task. Recently optics has begun to adapt methods from electronic systolic array processing[1] for these purposes[2,3]. Here we consider optical systolic polynomial evaluation using Horner's rule[4]. We will show that simple optical pipelines can evaluate polynomials with positive coefficients and that spatio-temporal arrays of these pipelines can perform far more general gasks.

For the moment, let us limit ourselves to
polynomials of one variable,
positive variables,
positive exponents, and
positive coefficients.
All of these restrictions can be removed, but these details do not add much to this illustration. Consider the polynomial $$y = p(x) = a_4 x^4 + a_3 x^3 + a_2 x^2 + a_1 x + a_0 = \quad (1)$$
$$(((a_4 x + a_3) x + a_2) x + a_1) x + a_0.$$

The factorization or synthetic division displayed in Eq. (1) is an old technique, known by Newton but usually ascribed to Horner, which provides a recursive means for evaluating polynomials. As is shown below, it is straightforward to cast the more general case (allowing negative x's, a's, and exponents) as a sum of calculations that may be carried out in series or in parallel.

Figure 1:
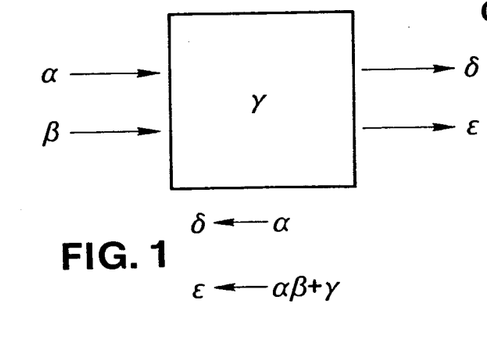
FIG. 1 illustrates the functions of a typical basic calculational module used in practicing the present invention. The outputs are the indicated functions of the inputs.
Figure 2:
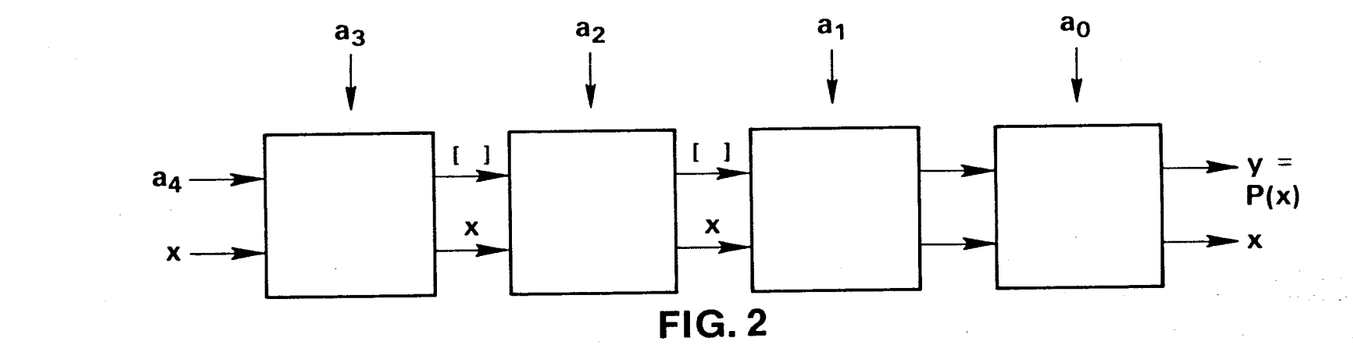
FIG. 2 shows a typical polynomial pipeline processor comprising four modules as in FIG. 1 to evaluate a fourth-order polynomial in one variable, x. Note that x is passed through unchanged.

Kung[5] has shown how to pipeline the polynomial evaluation of Eq. (1) using four digital modules. Each module performs the functions indicated in FIG. 1. It accepts two inputs $\alpha$ and $\beta$, and generates two outputs $\delta$ and $\epsilon$, where $$\delta = \alpha$$

and $$\epsilon = \alpha\beta + \gamma$$

and where $\gamma$ is a stored or locally supplied value. The pipelining of four such modules to calculate a 4th order polynomial is shown in FIG. 2.

Figure 3:
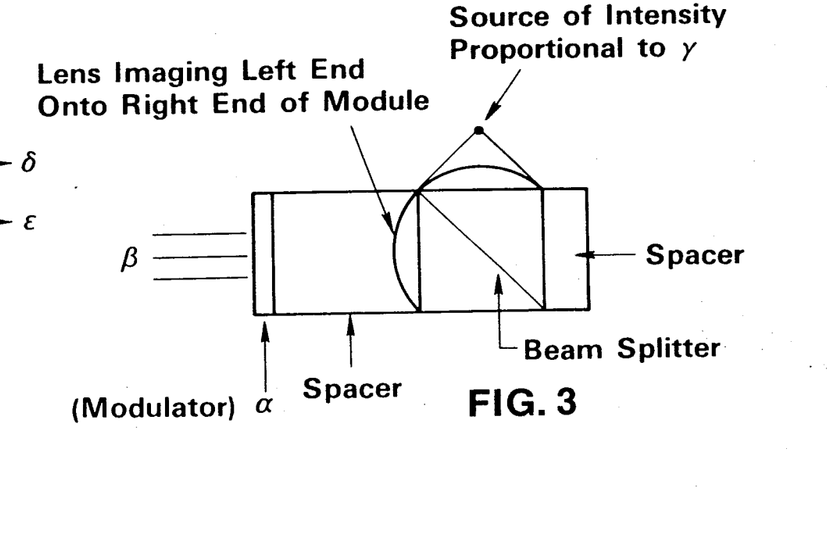
FIG. 3 shows a typical bulk optical embodiment of a calculational module as in FIG. 1.

An optical module for carrying out one step in the calculation is shown in FIG. 3. It has a modulator (corresponding to $\alpha$ in FIG. 1), a lens to keep the light together, a beam splitter functioning as a combiner (addition element), a new modulated light source (corresponding to $\gamma$ in FIG. 1), and spacers. An input beam of intensity $\beta$ leads to an output beam of the form $c[\alpha\beta + \gamma]$. Each module is calibrated to produce a constant $c(<1)$. Thus, we produce, as output from the four series-connected optical modules, a signal proportional to $c^4\gamma$. For large N's, we want c to be as large as possible to keep $c^4\gamma$ intense enough to detect rapidly.

Figure 4:
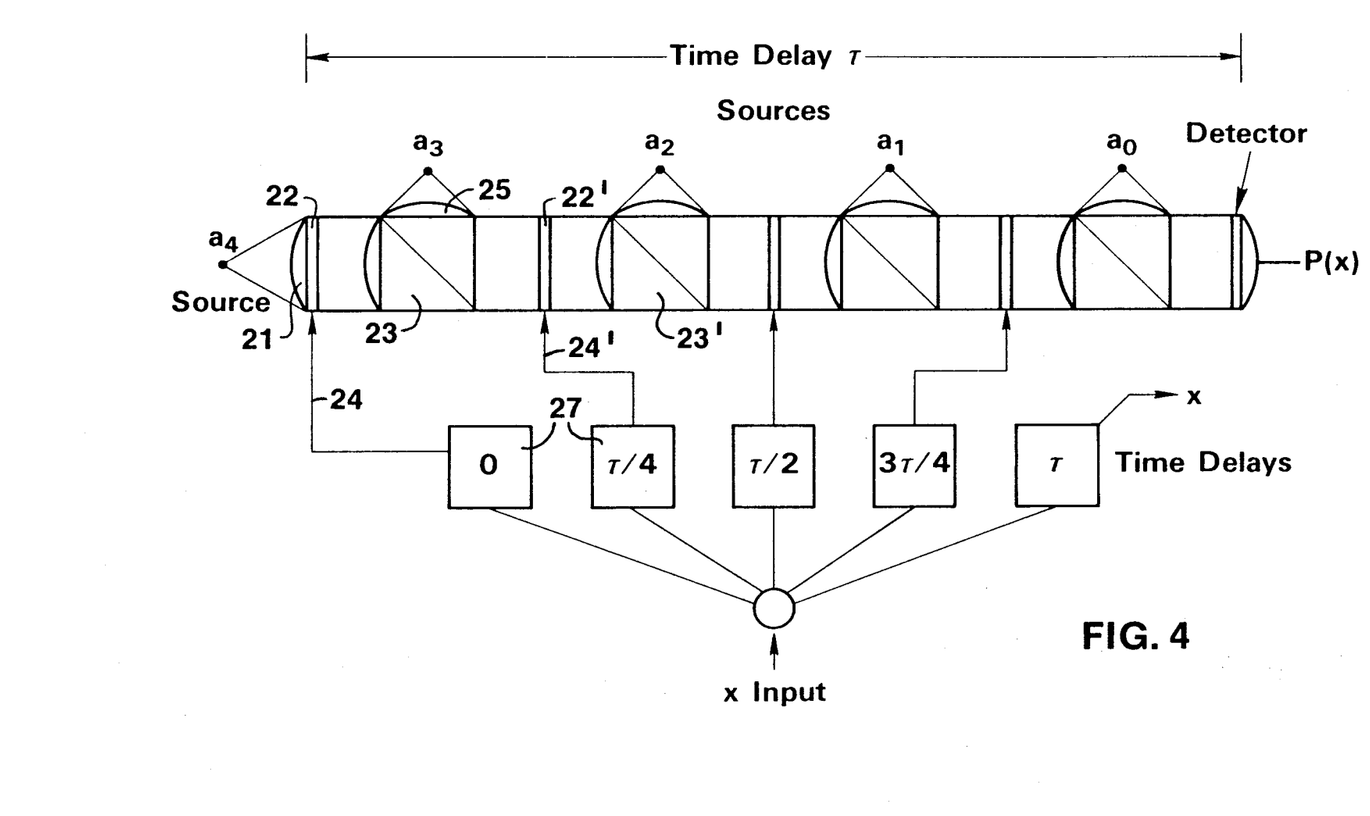
FIG. 4 shows a typical combination as in FIG. 2 of optical modules as in FIG. 3 and associated components in a polynomial pipeline processor according to the invention. The time delays are introduced to compensate for the propagation delay through the modules.

FIG. 4 shows a typical way to connect these modules. Delay lines of length $\tau/4$, $\tau/2$, $3\tau/4$, and $\tau$ give an output pair x,p(x) (after a delay time $\tau$) as fast as we can input x. Modulators capable of $10^9$ Hz are quite practical and much higher modulation frequencies are possible in principle. The ability of the system to handle high speed inputs is probably limited by the accuracy with which the time delays are set. Setting them to $10^{-11}$ sec ($\sim$ one millimeter) is routine.

OPTICAL IMPLEMENTATION OF PIPELINE PROCESSING

As is evident from the preceding discussion, the basic pipeline processor unit of FIG. 1 must be capable of performing the following functions:

Accept inputs x and $a'_{n+1}$ from unit n+1
Store $a_n$ or accept it from a local source
Compute $a_n' = a'_{n+1}x + a_n$
Transmit $a_n'$ and x to unit n-1.

Since there is currently no convenient method for multiplying two optical intensities, we will take x to be represented by a voltage and the $a_i$ and $a'_i$ by optical intensities.

An important consideration in assembling N of the basic units for the evaluation of Nth-order polynomials is to minimize the overall optical loss of the system. For example, in the arrangement of FIG. 3, we can maximize the throughput by decreasing the beam-combiner efficiencies $\eta_i$ as we move from left to right through the system. On the other hand, this would result in greatly increased fabrication difficulty, and the option of choosing a single $\eta$ so that identical modules can be used should be explored.

If the modules are identical, then the optical intensity corresponding to $a_{N-1}$ will suffer the greatest beam-combiner loss in traversing the system [$\eta < 0.5$ is assumed]. Its intensity after traversing the entire processor will be $$I_{out} = \eta(\eta-1)^{N-1}a_{N-1}, \quad (2)$$

from which it can easily be shown that to maximize $I_{out}$ we set $$\eta = (1/N) \quad (3)$$

If, for example, N=10, $\eta=0.1$ and $(1-\eta)=0.9$ corresponding to a loss of 0.46 dB per module. This is not an intolerable loss and it is relatively easy to make beam combiners with the required efficiency in both bulk and integrated optical configurations.

Figures 5, 6:
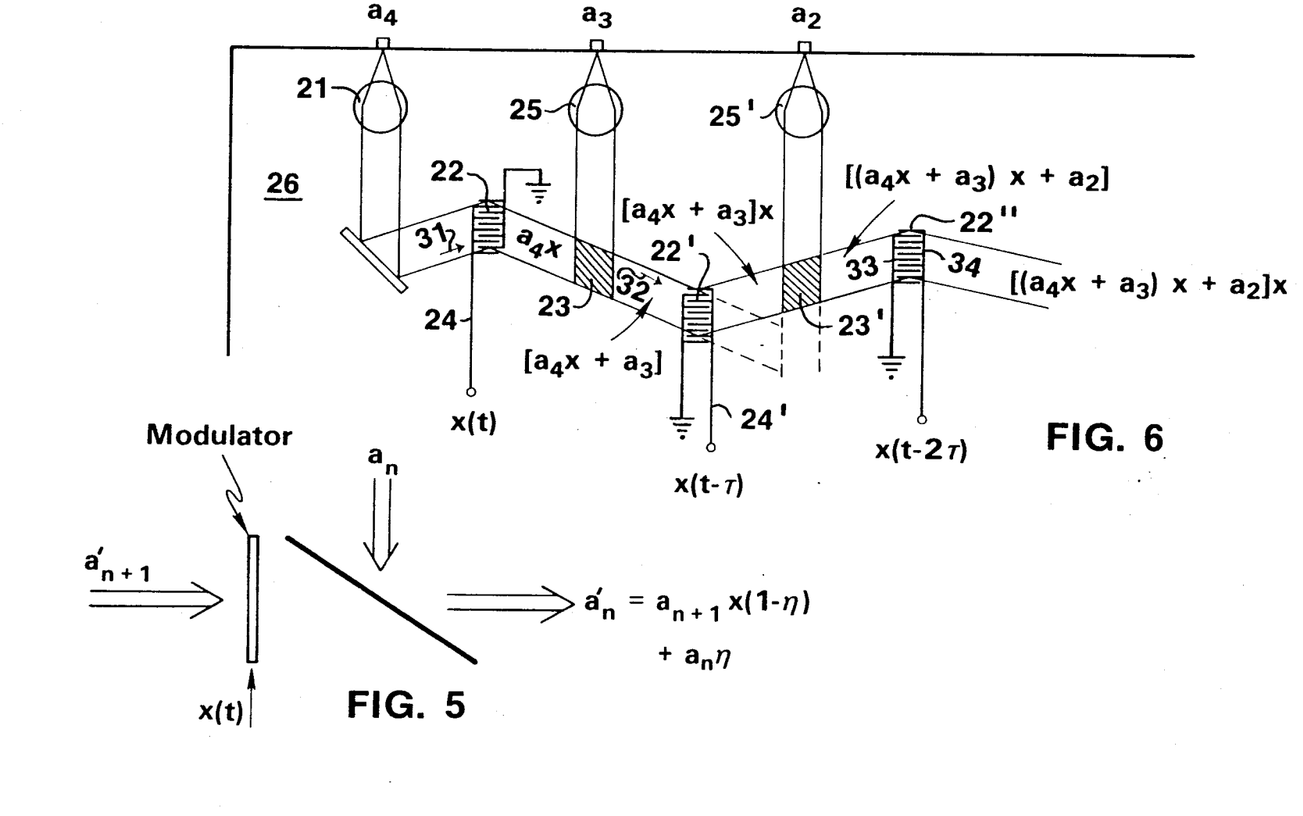
FIG. 5 illustrates the functions of a typical optical computational module as in FIGS. 3 and 4 using a beam splitter (combiner) of efficiency $\eta$.
FIG. 6 shows a portion of a typical embodiment of an integrated optical pipeline processor according to the invention utilizing electrooptic grating modulators and surface grating adders (combiners).

The most straightforward implementation of the basic computational unit is shown in FIG. 5. The beam combiner is assumed to have an efficiency $\eta$ and the modulator to respond to an electrical control signal V=f(x). To avoid interference effects, the sources from which the optical intensities representing $a_{n+1}$ and $a_n$ are derived must be mutually incoherent.

Several factors favor the integrated optical (IO) approach to the device design and fabrication.

(a) We want a high-speed device, so low control voltages V are desirable. Assuming electrooptic control elements, the IO technology has an advantage of approximately $10^2$.

(b) In an IO system, reflection problems are minimized. Typically we have one lens, one modulator and one beam combiner per computational unit. An entire bulk system must be immersed in an index-matching liquid to keep the losses and stray light due to reflection from the interfaces from becoming intolerable. In the IO format, there are essentially no such reflection problems. However, there are waveguide losses to contend with. If we assume a $LiNbO_3$ waveguide with 0.5 dB/cm loss, then the loss in a 0.5 cm-long computation unit will be 0.25 dB plus, perhaps, an additional 0.25 dB due to scatter from the components. In the bulk case if we have six surfaces having 6% loss per surface, the comparable figure is 1.6 dB per unit.

(c) The production of a device for the evaluation of a high-order polynomial requires the fabrication an alignment of a significant number of units. Several steps of photolithography are much simpler than mechanical alignment of individual components. However, in the IO case, coupling of many sources to a single waveguide can be difficult.

A presently preferred configuration for an integrated optical polynomial processor is shown in FIG. 6. It is a practical implimentation of the apparatus shown in FIG. 4. The substrate is y-cut $LiNbO_3$ with a planar single-mode Ti-indiffused waveguide. The basic processor unit consists of an interdigital electrode Bragg modulator[6] which is energized by a voltage proportional to x(t), and a fixed surface-grating beam combiner.[7] Each $a_i$ is generated by a diode laser whose output is collimated by an $As_2S_3$ Luneburg lens.[8]

The beam width of the light progressing through the processor can be bounded in part by the requirement that some minimal collimation be maintained without the use of intermediate lenses. This is necessary to ensure proper operation of the Bragg gratings. A reasonable starting point is to require that the diffraction spread be no greater than 0.1 mrad, a condition that is satisfied by a 4 mm beamwidth. This width places no strain on the modulator and adder fabrication, but may be unnecessarily severe in terms of grating requirements and lens fabrication tolerances.

The electrooptic modulator comprises an interdigital electrode structure that is fabricated by standard photolithographic techniques. It is, therefore, desirable to have a line and gap width of at least 1.5 μm, which implies a grating period Λ of at least 6 μm. From the Bragg equation, $$\sin \theta_B = \frac{\lambda_0}{2N\Lambda} \quad (4)$$

where $\lambda_0$ is the vacuum optical wavelength and N the mode index of the guided wave, we see that for GaAs-laser wavelengths and N=2.2, $\theta_B \leq 1.8°$. To maintain high modulator performance, even smaller angles, and therefore larger values of Λ, may be desirable.

It is quite straightforward to fabricate electrooptic grating modulators that achieve their maximum diffraction efficiencies with operating voltages of 5 volts or less. However, for reasons that are not well understood, the typical modulator has a maximum diffraction efficiency of slightly less than 100%. Unless 100% efficiency can be achieved the operating range $0 \leq x \leq 1$ will be compromised.

The beam combiners or addition elements are fabricated by the holographic exposure of a suitable photosensitive material to form the grating, and by a subsequent exposure through a mask to define the location and size of the grating region. The presence of the periodic overlay produces a periodic modulation of the mode index which has the effect of a thick phase grating on the guided wave. The magnitude of the mode-index perturbation is a function of the index of refraction of the overlay material. If modest diffractive efficiencies are desired, a standard photoresist[7] can be used. For higher efficiencies $As_2S_3$[9] can be used.

The collimating lenses are most conveniently formed as $As_2S_3$ Luneburg lenses.[8] The Luneburg lens is preferable to the geodesic lens because the entire lens array can be formed during a single deposition operation as opposed to the machining operation required to form geodesic lenses.

The f/number and focal length of the lens are determined by the desired widths of the collimated beam and the divergence of the laser output. For a typical high-quality GaAs single-mode laser the divergence perpendicular to the plane of the junction is about 35° (full width at half maximum power). In the waveguide this is reduced by the higher index to 16°. Therefore, to achieve the previously suggested beam width of 4 mm, a 14 mm focal length lens is required. The resultant f/number of f/3.5 is within the current state of the $As_2S_3$ Luneburg lens fabrication art.

Orientation of the laser so that its plane is perpendicular to the waveguide minimizes coupling difficulties and minimizes the length needed for beam expansion. It results in a TM guided wave which requires buffer layers under the modulator electrodes to eliminate scattering and absorptive losses due to the high surface field presented to the metal electrodes when this polarization is used.

Typical light sources in the design of FIG. 6 are GaAs single-mode diode lasers. It would simplify assembly of the processor if all of the $a_i$ could be derived from a single source, with the light distributed through a second set of modulators to impart the $a_i$ information to the appropriate beams. The problem with this approach is that, unless the beams incident on a given combiner are mutually incoherent, interference effects cause the output of the combiner to be a function of the phases and amplitudes of the two beams rather than a simple sum of the intensities. In addition, similar interference effects would take place at the detector so that the processor output would be highly ambiguous.

The range of wavelengths that can be spanned by the N lasers required for the processor is determined by the properties of the modulators. In particular, the diffraction efficiency falls off as the wavelength departs from the design value. The rate at which this occurs is a function of the grating geometry[10] and will not be discussed in detail here. The amount of dispersion that can be tolerated is determined by the accuracy to which the processor is being designed. For a 1% accuracy, the acceptable range of wavelength is about 100 Å. This requires some laser preselection, but is not too severe a requirement. The tradeoff study required to interrelate these parameters is obviously quite complex.

Figure 8:
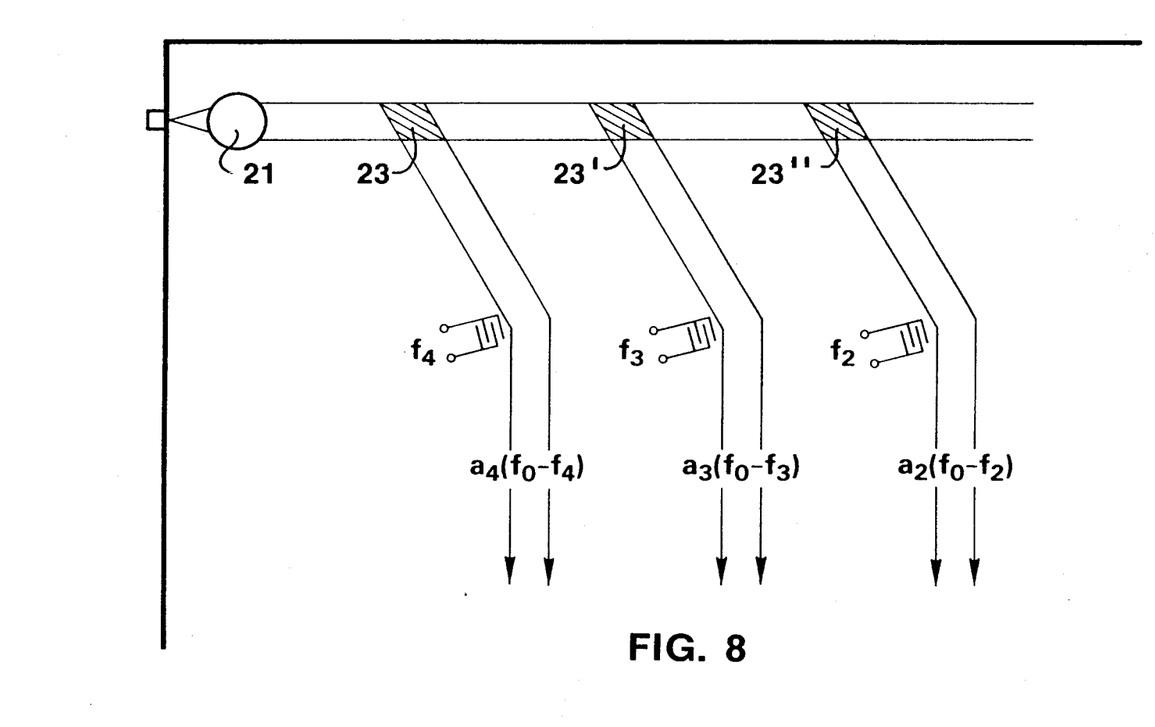
FIG. 8 shows a typical modification of a processor as in FIG. 6, wherein a single laser, beam splitters, and surface acoustic wave modulators furnish all of the light inputs.

As shown in FIG. 8, an alternative design that allows the use of a single laser is based on the use of a series of surface acoustic waves at frequencies $f_1, f_2 \ldots f_N$, used to impart frequencies shifts $f_1, f_2 \ldots$ to successive diffracted beams. This produces a set of input beams for the processor that are incoherent, but only to a limited extent, because there will be beats in the output at all possible $|f_i-f_j|$. If $|f_i-f_j| = 100$ MHz, it will be necessary to integrate the output for about 100 nsec to average out the effects of the beats. This will place a severe limitation on the processing speed.

Figure 9:
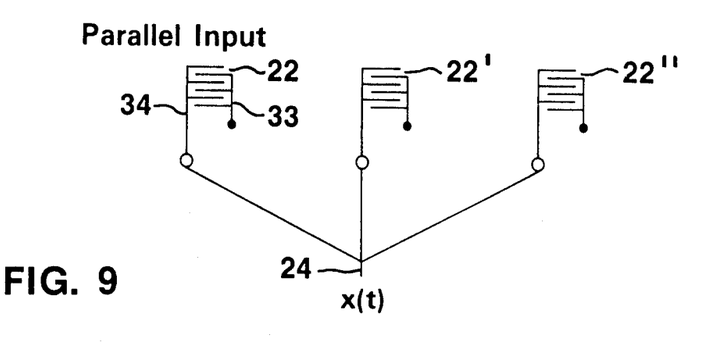
FIG. 9 shows another typical modification of a processor as in FIG. 4 or FIG. 6, wherein the same electrical potential is connected to all of the modulators with no time delays.

The data input, that is the introduction of x(t), may be accomplished in several ways. If the variation of x is slow compared to the time required for light to traverse the processor (~1 nsec) then data can be entered in parallel to all of the modulators, as in FIG. 9, with no loss of speed or accuracy. If, on the other hand, the rate of variation in x is comparable to or faster than the time required for the light to traverse the processor, then a strip line should be used, as in FIG. 10, to match the velocity of the electrical signal to the optical signal by producing the delays, τ, indicated in FIGS. 4 and 6.

COMBINATIONS OF POLYNOMIAL PIPELINES

Having described how a basic polynomial evaluation pipeline can be made, we turn now to the question of how to combine them to handle less restrictive cases.

First, let us remove the limitation on polynomial order. Suppose the longest pipeline that can be conveniently fabricated is N=10 and we want to handle polynomials up to N=20. The Horner algorithm can be broken after any stage with the output from one stage being detected and used as the input to the next stage. Thus, in this case, we would detect the signal after stage 10, then re-inject it into a second 10-stage pipeline.

Figure 11:
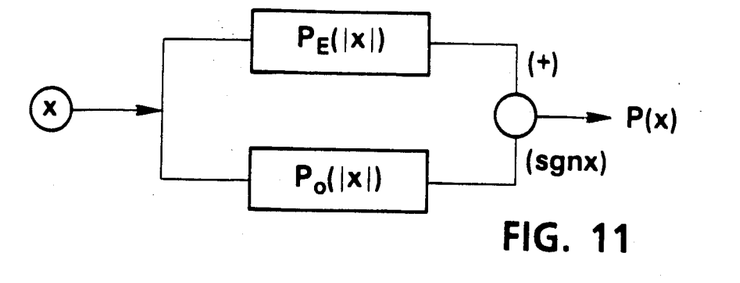
FIG. 11 shows a typical combination of pipeline processors as in FIGS. 4 and 6 to accommodate all real values of x, positive, zero, and negative.

Second, we can remove the restriction to non-negative x's by connecting a pair of pipeline processors as shown in FIG. 11. To allow for all real values of x (positive) zero, and negative) we can arrange the polynomial into odd and even parts. Thus $$P(x) = P_e(x) + P_o(x), \quad (5)$$

where $$P_e(x) = a_0 + a_2 x^2 + \ldots \quad (6)$$

and $$P_o(x) = a_1 x + a_3 x^3 + \ldots \quad (7)$$

Let us write $$x = (\text{sgn } x)|x|. \quad (8)$$

Then $$P(x) = P_e(|x|) + (\text{sgn } x) P_o(|x|). \quad (9)$$

Thus the real x problem is reduced to two non-negative x problems.

Third, we can remove the restriction to non-negative coefficients. Let us write, for instance, $$P_e(|x|) = P_e^{(+)}(|x|) - P_e^{(-)}(|x|) \quad (10)$$

where $$P_e^{(+)}(|x|) \text{ and } P_e^{(-)}(|x|) \quad (11)$$

have only non-negative coefficients. To handle all real x's and all real $a_k$'s, we need four pipelines.

Fourth, we can go to complex x's and $a_k$'s. This is straightforward using the same technique of dividing the problem we cannot solve into many problems we can solve (non-negative x's and $a_k$'s). Let any complex coefficient be written $$a = R(a) + iI(a). \quad (12)$$

Figure 7A:
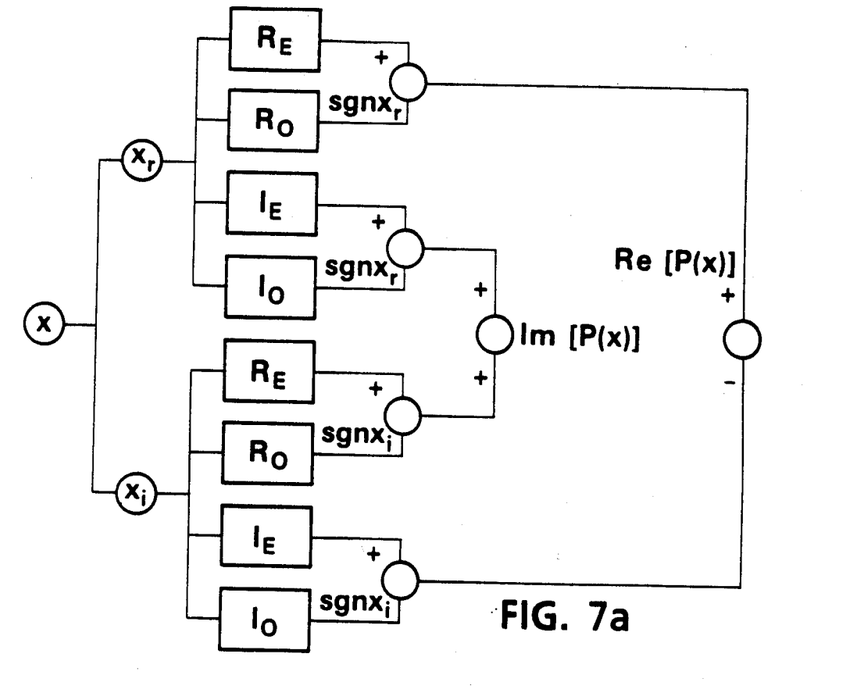
Figure 7B:
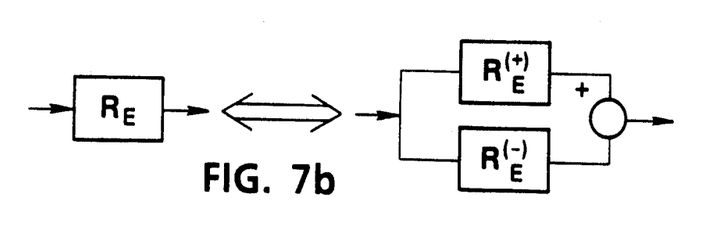

Then we can write $$P(x) = R(x) + iI(x), \quad (13)$$

where $R(x)$ and $I(x)$ have only real a's. But each a can still be positive or negative. The net system looks like FIGS. 7a and 7b.

Fifth, we can handle polynomials in multiple variables such as $$P(x_1, x_2, \ldots, x_M) = \Sigma a_{i,j,\ldots,m} x^i_1 x^j_2 \cdots x_M^m \quad (14)$$

by the same method (reduction to easy problems). For example $$P(x,y) = \sum_{m,n} a_{mn} x^m y^n = \Sigma b_m x^m \quad (15)$$

where $$b_m = \sum_n a_{mn} y^n \quad (16)$$

Given a value for y, a pipeline can be devised for calculating each $b_m$. Clearly this is easily generalized.

For a polynomial of two variables we can write:

$$p(x,y) = \sum_{\substack{m \leq o \\ n \leq o}}^{m+n \leq 4} b_{mn} x^m y^n$$

Figure 12:
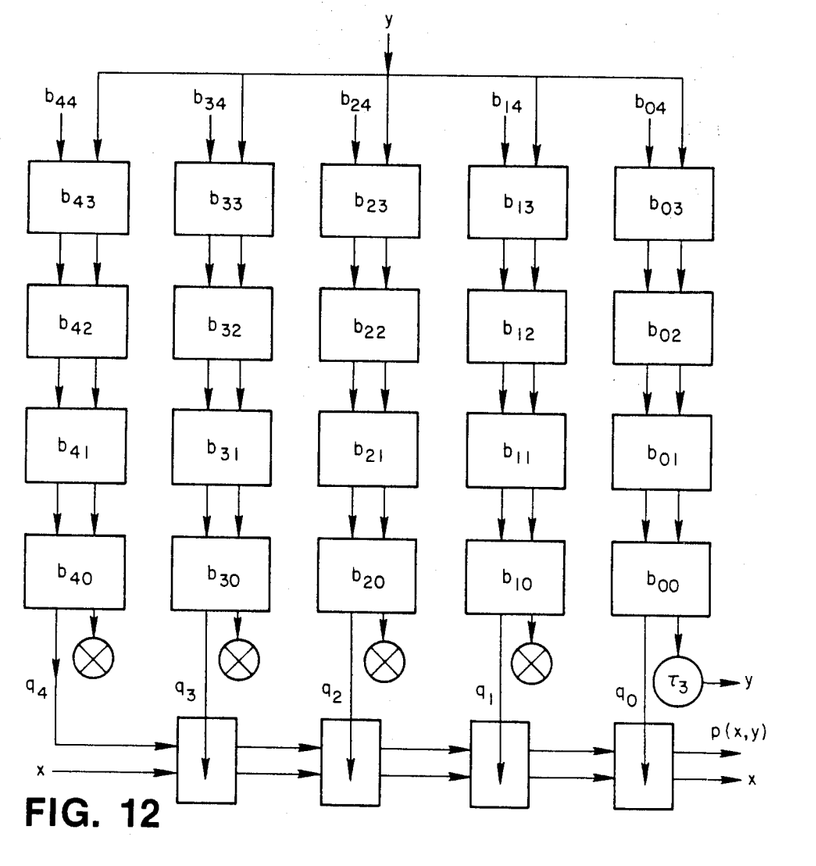
FIG. 12 shows a typical array of modules as in FIGS. 1–6 for evaluating polynomials in two variables.
Figure 13:
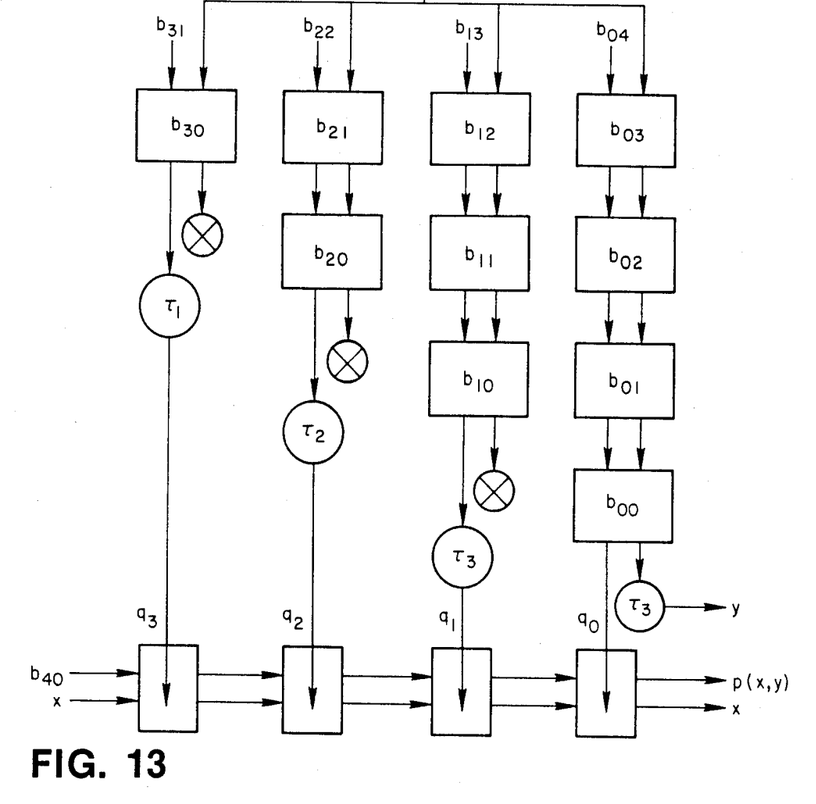
FIG. 13 shows another typical array as in FIG. 12 for evaluating polynomials in two variables.

It is straightforward to rewrite this as:

$$p(x,y) = \sum_{m=o}^{4} x^m \sum_{n=o}^{4} b_{mn} y^n$$

where now the restrictions are included by allowing $b_{mn}$ to be zero: 15 $b_{mn}$ are non-zero and 10 are zero. Then, we must construct the y-polynomials as before, using (generally) 4 pipelines of the form of FIG. 2. This is illustrated in FIG. 12 for the general case and in FIG. 13 specialized to $m+n \leq 4$.

Optical function evaluation based upon the concepts described above is so fast that it permits us to search for roots, extrema, derivatives, concidences, etc. systematically, faster than they could be calculated digitally. Such optical calculators are ideal for real time adaptive processing because they are extremely fast and easily reprogrammed. Integration is simply summation as x is varied (ramped) at a high uniform speed. A nonuniform speed of x variation integrates the product of the polynomial with the modulating function. Steepest descent curve fitting (modulating the different polynomial coefficients at different frequencies to obtain the gradient and directly integrating the squared difference) is easily programmed. Cascades of small-N units can handle much larger polynomials.

The optical processor can be implemented in bulk (three-dimensional) modules or in integrated-optics (two-dimensional) modules. The latter approach involves more initial expense but offers considerable advantages in cost and compactness of mass-produced optical function calculators. This technology also offers ruggedness and permanent alignment with low power and voltage requirements.

CONCLUSIONS

Optical systolic polynomial evaluation appears to be feasible and promising. Although detailed analyses of speed, accuracy, dynamic range, and related questions have yet to be reported, it is clear than an integrated optical pipeline can be fabricated and can have a variety of applications.

By connecting pipelined polynomial evaluators in series and/or in parallel, we can perform very general operations. The applications appear to be quite wide ranging. They include solving $P(\bar{x}) = 0$ by ramping $\bar{x}$ while monitoring $P(\bar{x})$
solving $P_1(\bar{x}) - P_2(\bar{x}) = 0$,
solving $P_1(\bar{x}) = P_2(\bar{x}) = P_3(\bar{x})$ by seeking coincident zeros of two difference equations, differentiating at $x_o$ by setting $x_o + \epsilon \cos \omega t$ and monitoring the $\cos \omega t$ part of $P[\bar{x}(t)]$, and integrating by ramping x and time integrating $P[\bar{x}(t)]$.

[1] H. T. Kung, "Why Systolic Architectures?", Computer, 15, 37–46 (1982).

[2] H. J. Caulfield, W. T. Rhodes, M. J. Foster, and Sam Horvitz, "Optical Implementation of Systolic Array Processing", Opt. Com., 40, 86–90 (1981).

[3] Jacques E. Ludman, H. J. Caulfield, and P. Denzil Stilwell, Jr., "Robust Optical Systolic Long-Code Processor", Opt. Eng., 21 833–836 (1982).

[4] A. Ralston, *A First Course in Numerical Analysis* (McGraw-Hill, NY, 1965) pp 232–235.

[5] H. T. Kung, "Notes on VLSI Computation" Technical Report VLSI Document V080, Carnegie-Mellon University, Dept. of Computer Science, Pittsburgh, PA 15213 (September 1980).

[6] J. M. Hammer and W. Phillips, "Low-Loss Single-Mode Optical Waveguides and Efficient High-Speed Modulators of $LiNb_xTa_{1-x}O_3$ on $LiTaO_3$", Appl. Phys. Lett., 24 545–547 (1974).

[7] N. F. Hartman, C. M. Verber, and C. M. Chapman, "Fabrication of a 16-Channel Integrated Optical Data Preprocessor", IEEE Trans. on Components, Hybrids and Manufacturing Technology, CHMT-4 327–331 (1981).

[8] James R. Busch, Van E. Wood, Duncan T. Moore, and W. H. Southwell, "Rectangular Luneburg-Type Lenses for Integrated Optics", Opt. Let.

(9) T. Suhara, Y. Handa, H. Nishihara and J. Koyama, "Monolithic Integrated Microgratings and Photodiodes for Wavelength Demultiplexing", Appl. Phys. Lett., 40 120–122 (1982).

(10) Herwig Kogelnik, "Coupled Wave Theory for Thick Hologram Gratings", Bell Syst. Tech. J. 48, 2909–2947 (1969).

Referring now to FIG. 4, a typical method according to the present invention for providing an optical analog quantity that is approximately proportional to the value of a polynomial function expressible in the form $$p(x) = a_n x^n + a_{n-1} x^{n-1} + \cdots + a_2 x^2 + a_1 x + a_0$$
$$= ((((a_n x + a_{n-1})x + a_{n-2})x + \cdots + a_2)x + a_1)x + a_0$$

comprises directing input light $a_4$, as via a lens 21, of intensity approximately proportional to the coefficient $a_n$ to the input end of an nth optical module comprising at the input end a modulator 22 whose output light intensity is approximately proportional to a known function of an electrical potential difference across it and at the output end a beam combiner 23, applying across the modulator 22, while the light is passing through it, a potential difference, as indicated at 24 (versus ground), approximately proportional to a function of x such that the intensity of the output light from the modulator 22 is approximately proportional to $a_n x$, directing the output light from the modulator 22, through the beam combiner 23, to the output end of the optical module, directing input light $a_3$, as via a lens 25, of intensity approximately proportional to the coefficient $a_{n-1}$, via the beam combiner 23, to the output end of the optical module, to combine with the output light from the modulator 22 so that the intensity of the output light from the nth optical module is approximately proportional to $a_n x + a_{n-1}$; directing the output light from the nth optical module to the input end of an (n−1)th optical module essentially similar to the nth, applying across the modulator 22′ in the (n−1)th optical module, while the light received from the nth module is passing through it, a potential difference, as indicated at 24′ (versus ground), approximately proportional to a function of x such that the intensity of the output light from the modulator 22′ is approximately proportional to $(a_n x + a_{n-1})x$, directing the output light from the modulator 22′, through the beam combiner 23′, to the output end of the optical module, directing input light $a_2$, as via a lens 25′, of intensity approximately proportional to the coefficient $a_{n-2}$, via the beam combiner 23, to the output end of the optical module, to combine with the output line from the modulator 22′ so that the intensity of the output light from the (n−1)th optical module is approximately proportional to $(a_n x + a_{n-1})x + a_{n-2}$; and so on, in the same manner, and finally to the first optical module so that the intensity of the polynomial function output line p(x) from the first optical module is approximately proportional to $$((((a_n x + a_{n-1})x + a_{n-2})x + \cdots + a_2)x + a_1)x + a_0.$$

Typically the light of intensity approximately proportional to $a_n, a_{n-1}, a_{n-2}, \cdots, a_1, a_0$ is substantially monochromatic and mutually incoherent. Typically the modules comprise either bulk optical components or integrated optical components, and the modulators are either electrooptic or acoustooptic. Preferably each modulator 22,22′, etc comprises an electrooptic grating in a planar waveguide 26, as in FIG. 6.

Figure 10:
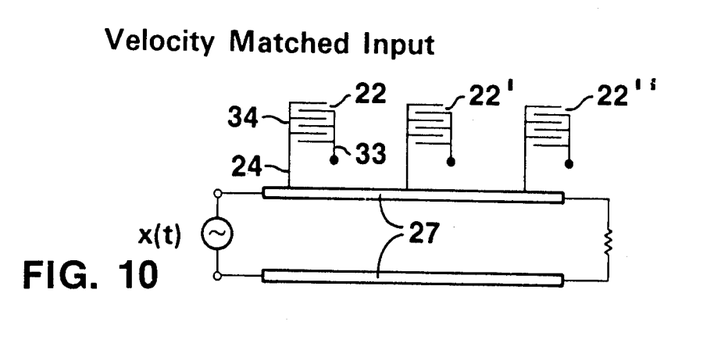
FIG. 10 illustrates typical circuitry employing a strip line to provide the time delays indicated in FIGS. 4 and 6.

As shown in FIGS. 4, 6, and 10, the potential difference at 24,24′, etc applied across each modulator 22,22′, etc is connected via time delay circuitry 27 such that each potential difference is applied to each individual modulator while the light received from the adjacent module, and that had passed through its modulator while the same potential difference had been applied across it, is passing through the modulator. Where conditions permit, however, the same potential difference 24 may be applied across all of the modulators 22,22′, etc simultaneously, as in FIG. 9, and remains within small enough limits during the time required for light to traverse all of the optical modules as to provide intensities to the polynomial function output light p(x) from the first module within a predetermined desired accuracy.

Where identical modules are to be used throughout a pipeline, each beam combiner 23,23′, etc preferably has an efficiency of about (1/n). Where overall optical loss is to be minimized, then preferably the beam combiner in the nth module has an efficiency of $\frac{1}{2}$; the beam combiner in the (n−1)th module has an efficiency of $\frac{1}{3}$; the next, $\frac{1}{4}$; and so on, 1/5,1/6, etc; to the beam combiner in the first module having an efficiency of $$\frac{1}{n+1}.$$

Typically the modules are arranged in series to form an integral block; and the modules typically are either bulk components, each contiguous to the next, as in FIG. 4, or integrated components in a single waveguide 26, as in FIG. 6.

To deal with negative values, complex functions, a plurality of variables, and other functions requiring more than one block, a plurality of blocks are responsively arranged either in spatial or temporal combination, as in FIGS. 7, 11, 12, and 13. Typically the polynomial function output light from at least one block is directed to determine the intensity of at least one light input to another block, as in FIGS. 7, 12, and 13; and the polynomial function output light of at least one block typically determines the intensity of at least one coefficient input light of a block to which it is directed.

As illustrated in FIG. 6, typical apparatus according to the present invention for providing an optical analog quantity that is approximately proportional to the value of a polynomial function expressible in the form $$p(x) = a_n x^n + a_{n-1} x^{n-1} + \cdots + a_2 x^2 + a_1 x + a_0$$
$$= ((((a_n x + a_{n-1})x + a_{n-2})x + \cdots + a_2)x + a_1)x + a_0$$

comprises an electrooptic planar waveguide 26; a plurality, n, of integrated optical modules in the waveguide 26, each module comprising at its input end a modulator 22,22′, etc for receiving light travelling in a predetermined input direction 31 and tramsmitting a controlled proportion thereof further in a predetermined output direction 32 to the output end, and a beam combiner 23,23′, etc for receiving the light from the modulator 22, etc and transmitting a predetermined proportion thereof further in the predetermined output direction 32 and on through the output end of the module; the modulator 22, etc comprising electrooptic diffractive means comprising a pair of electrodes 33,34 for forming a Bragg grating therebetween, positioned with a direction of Bragg incidence approximately in the predetermined input direction 31, the first electrode 33 comprising a first set of substantially straight and parallel, thin, elongate, electrically conductive members connected together at one end, and the second electrode 34 comprising a second set of substantially straight and parallel, thin, elongate, electrically conductive members, interleaved with the first set, insulated therefrom, and connected together at the opposite end, so that when a first electrical potential (ground) is applied to the first electrode 33 and a second electrical potential 24,24' etc is applied to the second electrode 34 the controlled portion of input light transmitted through the modulator 22, etc is provided by a Bragg diffraction thereof in the predetermined output direction 32 and has an intensity approximately proportional to a known function of the difference between the first and second electrical potentials; and the beam combiner 23 comprising a fixed surface grating; diode laser means $a_4$ and collimating means 21 for directing input light of intensity approximately proportional to the coefficient $a_n$ to the input end of the nth optical module; means for applying, as at 24, across the electrodes 33,34 of the modulator 22, while the light is passing through the modulator 22, a potential difference approximately proportional to a function of x such that the intensity of the output light from the modulator is approximately proportional to $a_n x$; diode laser means $a_3$ and collimating means 25 for directing input light of intensity approximately proportional to the coefficient $a_{n-1}$, via the beam combiner 33, to the output end of the optical module, to combine with the output light from the modulator 22 so that the intensity of the output light from the nth optical module is approximately proportional to $a_n x + a_{n-1}$; the (n−1)th optical module being positioned to receive the output light from the nth optical module in the predetermined input direction 31 of the (n−1)th module; means for applying, as at 24', across the electrodes 33,34 of the modulator 22' in the (n−1)th optical module, while the light received from the nth module is passing through the modulator 22', a potential difference approximately proportional to a function of x such that the intensity of the output light from the modulator is approximately proportional to $(a_n x + a_{n-1})x$; diode laser means $a_2$ and collimating means 25' for directing input light of intensity approximately proportional to the coefficient $a_{n-2}$, via the beam combiner 23', to the output end of the optical module, to combine with the output light from the modulator 22' so that the intensity of the output light from the (n−1)th optical module is approximately proportional to $(a_n x + a_{n-1})x + a_{n-2}$; and so on, in the same manner, and finally to the first optical module, so that the intensity of the polynomial function output light p(x) from the first optical module is approximately proportional to $$((((a_n x + a_{n-1})x + a_{n-2})x + \cdots + a_2)x + a_1)x + a_0.$$

Typically the waveguide 26 comprises a planar single mode waveguide comprising titanium diffused into a surface of a substrate comprising y-cut lithium niobate, each diode laser means $a_4, a_3$, etc comprises a gallium arsenide single-mode laser, and each collimating means 21,25, etc comprises a Luneburg lens, which typically comprises arsenic trisulfide. Preferably the f/number of the lens is about f/3 to f/6, and the focal length is about 15 to 30 millimeters.

Typically each diode laser means $a_4$, etc is positioned with the plane of the diode junction approximately perpendicular to the plane of the waveguide 26, and each modulator 22, etc includes, between the waveguide 26 and the electrodes 33,34, a transparent electrically insulating buffer layer of thickness less than about one-tenth of the spacing between adjacent conductive members of each electrode 33,34.

Preferably the light of intensity approximately proportional to $a_n, a_{n-1}, a_{n-2}, \cdots, a_1, a_0$ is substantially monochromatic and mutually incoherent. Typically each diode laser means $a_4$, etc provides light of a different wavelength, all of the wavelengths preferably being within a range of about 100 Angstroms. In some embodiments of the invention, as shown in FIG. 8, all of the diode laser means are formed by a single laser $a_{21}$ and surface acoustic wave means $f_4, f_3$, etc which shift the frequency of the light directed to each optical module so that the frequency is different for each module; and means are included for integrating the output of each module for at least about ten cycles of the minimum difference frequency, to provide an output responsive to the average intensity of the components at the various frequencies that are present.

As shown in FIGS. 6 and 10, the potential difference at 24,24', etc applied across the electrodes 33,34 of each modulator 22,22', etc is connected via time delay circuitry 27 such that each potential difference is applied to each individual modulator while the light received from the adjacent module, and that had passed through its modulator while the same potential difference had been applied across it, is passing through the modulator. Where conditions permit, however, the same potential difference 24 may be applied across the electrodes 33,34 of all of the modulators 22, etc simultaneously, as in FIG. 9, and remains within small enough limits during the time required for light to traverse all of the optical modules as to provide intensities of the polynomial function output line p(x) from the first module within a predetermined desired accuracy.

Where identical modules are to be used throughout a pipeline, each beam combiner 23,23', etc preferably has an efficiency of about 1/n. Where overall optical loss is to be minimized, then preferably the beam combiner in the nth module has an efficiency of $\frac{1}{2}$; the beam combiner in the (n−1)th module has an efficiency of $\frac{1}{3}$; the next, $\frac{1}{4}$; and so on, 1/5,1/6, etc; to the beam combiner in the first module having an efficiency of $$\frac{1}{n+1}.$$

Typically the modules are arranged in series to form an integral block; and the modules typically are integrated components in a single waveguide 26, as in FIG. 6.

To deal with negative values, complex functions, a plurality of variables, and other functions requiring more than one block, a plurality of blocks are responsively arranged either in spatial or temporal combination, as in FIGS. 7a, 7b, 11, 12, and 13. Typically the polynomial function output light from at least one block is directed to determine the intensity of at least one light input to another block, as in FIGS. 7a, 7b, 12, and 13; and the polynomial function output light of at least one block typically determines the intensity of at least one coefficient input light of a block to which it is directed.

I claim:

1. A method for providing an optical analog intensity that is approximately proportional to the value of a polynomial function expressible in the form $$p(x) = a_n x^n + a_{n-1} x^{n-1} + \cdots + a_2 x^2 + a_1 x + a_0$$
$$= ((((a_n x + a_{n-1})x + a_{n-2})x + \cdots + a_2)x + a_1)x + a_0$$

wherein p(x) is a function of x, x is any variable, n is any positive integer, the coefficients, $a_i$, are any constants, variables, or constants and variables;

comprising:

directing input light of intensity approximately proportional to the coefficient $a_n$ to the input end of an nth optical module comprising at the input end a modulator whose output light intensity is approximately proportional to a known function of an electrical potential difference across it and at the output end a beam combiner, applying across the modulator, while the light is passing through it, a potential difference approximately proportional to a function of x such that the intensity of the output light from the modulator is approximately proportional to $a_n x$, directing the output light from the modulator, through the beam combiner, to the output end of the optical module, directing input light of intensity approximately proportional to the coefficient $a_{n-1}$, via the beam combiner, to the output end of the optical module, to combine with the output light from the modulator so that the intensity of the output light from the nth optical module is approximately proportional to $a_n x + a_{n-1}$, directing the output light from the nth optical module to the input end of an (n−1)th optical module essentially similar to the nth, applying across the modulator in the (n−1)th optical module, while the light received from the nth module is passing through it, a potential difference approximately proportional to a function of x such that the intensity of the output light from the modulator is approximately proportional to $(a_n x + a_{n-1})x$, directing the output light from the modulator, through the beam combiner, to the output end of the optical module, directing input light of intensity approximately proportional to the coefficient $a_{n-2}$, via the beam combiner, to the output end of the optical module, to combine with the output light from the modulator so that the intensity of the output light from the (n−1)th optical module is approximately proportional to $(a_n x + a_{n-1})x + a_{n-2}$, and so on, in the same manner, and finally to the first optical module, so that the intensity of the polynomial function output light from the first optical module is approximately proportional to $$((((a_n x + a_{n-1})x + a_{n-2})x + \cdots + a_2)x + a_1)x + a_0.$$

2. A method as in claim 1, wherein the light of intensity approximately proportional to $a_n$, $a_{n-1}$, $a_{n-2}$, ---, $a_1$, $a_0$ is substantially monochromatic and mutually incoherent.

3. A method as in claim 1, wherein the modules comprise either bulk optical components or integrated optical components, and the modulators are either electrooptic or acoustooptic.

4. A method as in claim 1, wherein each modulator comprises an electrooptic grating in a planar waveguide.

5. A method as in claim 1, wherein the potential difference applied across each modulator is connected via time delay circuitry such that each potential difference is applied to each individual modulator while the light received from the adjacent module, and that had passed through its modulator while the same potential difference had been applied across it, is passing through the modulator.

6. A method as in claim 1, wherein the same potential difference is applied across all of the modulators simultaneously and remains within small enough limits during the time required for light to traverse all of the optical modules as to provide intensities to the polynomial function output light from the first module within a predetermined desired accuracy.

7. A method as in claim 1, wherein each beam combiner has an efficiency of about 1/n.

8. A method as in claim 1, wherein the beam combiner in the nth module has an efficiency of $\frac{1}{2}$; the beam combiner in the (n−1)th module has an efficiency of $\frac{1}{3}$; the next, $\frac{1}{4}$; and so on, 1/5, 1/6, etc.; to the beam combiner in the first module having an efficiency of $$\frac{1}{n+1}.$$

9. A method as in claim 1, wherein the modules are arranged in series to form an integral block.

10. A method as in claim 9, wherein the modules are either bulk components, each contiguous to the next, or integrated components in a single waveguide.

11. A method as in claim 9, wherein a plurality of blocks are responsively arranged either in spatial or temporal combination.

12. A method as in claim 11, wherein the polynomial function output light from at least one block is directed to determine the intensity of at least one light input to another block.

13. A method as in claim 12, wherein the polynomial function output light of at least one block determines the intensity of at least one coefficient input light of a block to which it is directed.

* * * * *